United States Patent

[11] 3,572,752

| [72] | Inventor | Charles E. Harp<br>2110 Harper St., Pasadena, Tex. 77502 |
|---|---|---|
| [21] | Appl. No. | 844,434 |
| [22] | Filed | July 24, 1969 |
| [45] | Patented | Mar. 30, 1971 |

[54] LANDING GEAR FOR SEMI-TRAILERS AND THE LIKE
3 Claims, 5 Drawing Figs.

[52] U.S. Cl................................................. 280/150.5, 248/431, 254/86
[51] Int. Cl.................................................. B60s 9/02
[50] Field of Search........................................... 280/150.5, 150, 475; 254/86; 248/164, 188.6, 431, 432

[56] References Cited
UNITED STATES PATENTS
2,137,703  11/1938  Seyferth ..................... 280/150.5

| 2,841,409 | 7/1958 | Osier............................ | 248/432X |
| 2,863,670 | 12/1958 | Larson ......................... | 280/150.5 |

FOREIGN PATENTS

| 594,093 | 3/1960 | Canada ......................... | 280/150.5 |
| 447,201 | 4/1949 | Italy .............................. | 254/86 |

*Primary Examiner*—Leo Friaglia
*Assistant Examiner*—Winston H. Douglas
*Attorney*—R. Werlin ABSTRACT: A landing gear for supporting the forward end of a semitrailer and the like after the prime mover or tractor has been removed. The landing gear comprises a pair of support members mounted on opposite sides of the forward end of the trailer and comprising a scissorlike construction which forms a triangular ground supporting portion which can then be collapsed and folded underneath the trailer when not in use.

PATENTED MAR 30 1971 3,572,752
SHEET 1 OF 2
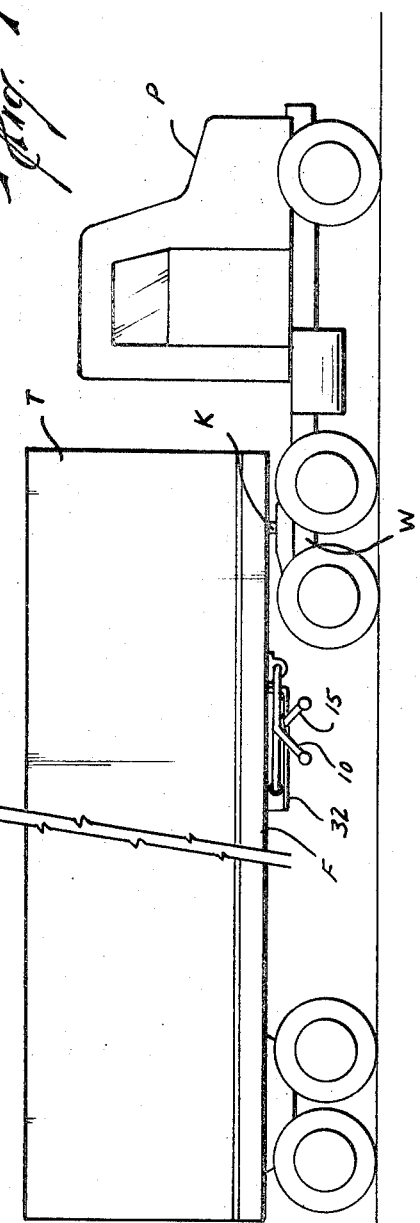
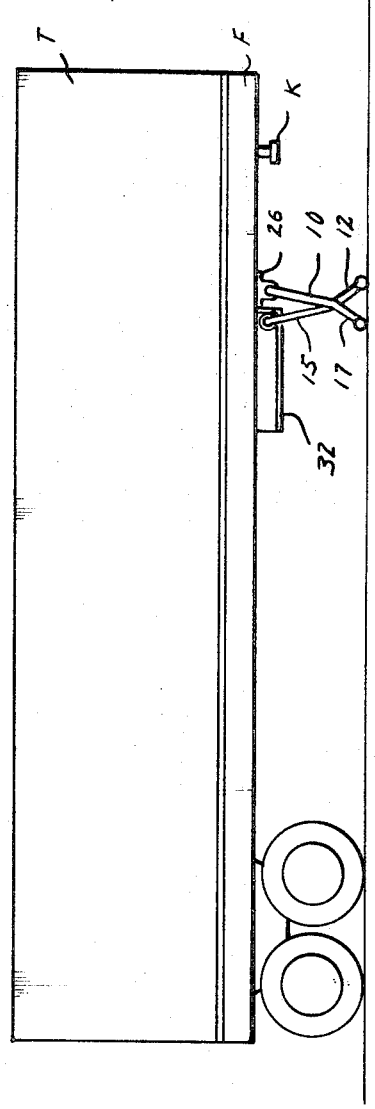
Charles E. Harp
INVENTOR.
BY
ATTORNEY

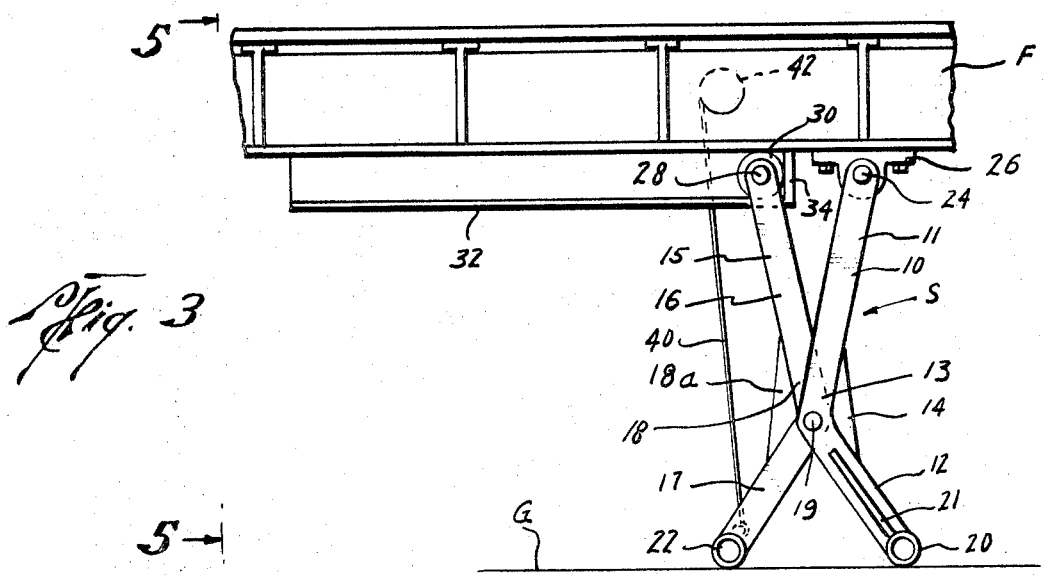
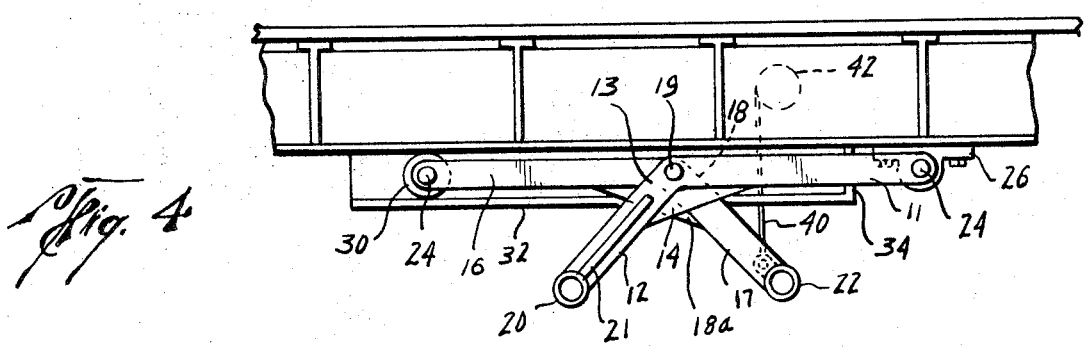
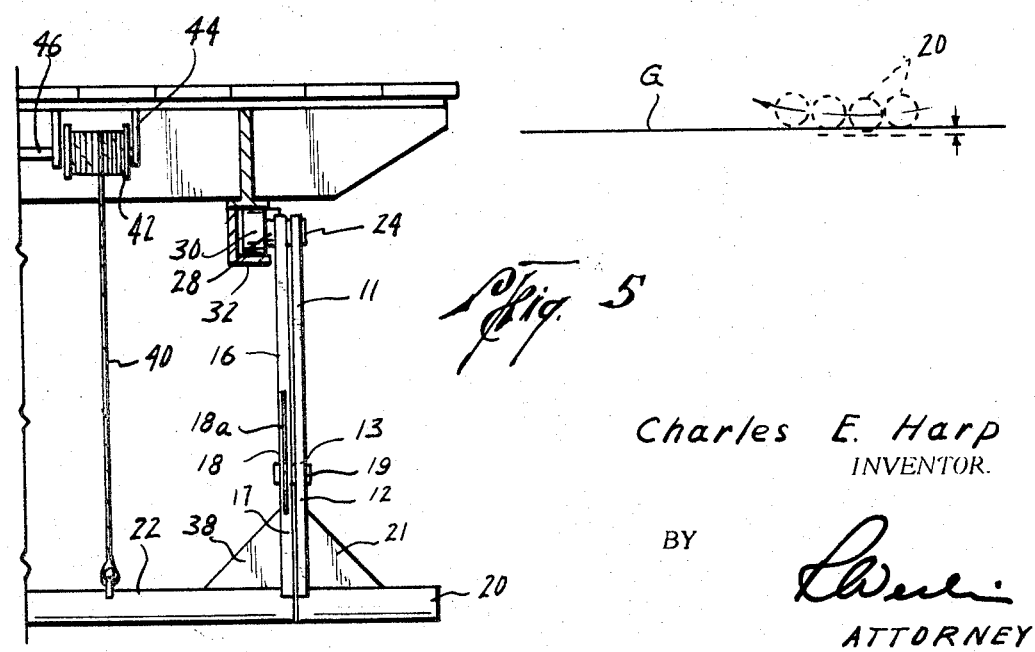
Charles E. Harp
INVENTOR.

LANDING GEAR FOR SEMI-TRAILERS AND THE LIKE

In semitrailers, floats and the like, which are normally two-wheeled vehicles, the forward end of which is adapted to be connected to a prime mover or tractor by which the trailing vehicle is propelled on highways, landing gear is required to support the forward end of the semitrailer when it has been disconnected from its tractor or other prime mover. The most common form of landing gear comprises a pair of posts or legs usually rigidly secured to the opposite sides of the trailer and extending vertically downwardly to a point a short distance above the ground level. The legs are usually fitted with foot members which are retractably disposed in the lower ends of the legs to be moved either hydraulically or mechanically to extend and retract them to and from ground-supporting position. When ground support is required, the foot members will be extended to engage the ground whereupon the tractor can be disconnected from the trailing vehicle and withdrawn. When the trailer is reconnected to the tractor the foot members are retracted to a degree necessary to afford some road clearance for the lower ends of the leg members and the vehicle is thereby made ready to travel.

This type of conventional landing gear is subject to numerous difficulties because of the limited road clearance available below the retracted foot pieces. Large obstructions or even substantial irregularities in the road surface which may be encountered may be struck by the depending leg members causing them to be severely damaged or even broken. This is commonly encountered when crossing railroad tracks on grade crossings. Also, it is not uncommon that the operator fails to retract the foot members of a landing gear with the result that they drag the ground or be so close thereto that they will strike any obstacles of even low height which may be encountered by the vehicle with resulting damage to the landing gear. A further disadvantage of such conventional post-type landing gear constructions is that it is frequently necessary or desirable, particularly when the trailer is a flat bed or "float" type that the forward end be capable of being lowered to the ground in order to permit "over-the-end" loading of heavy equipment and the like onto the trailer. With the conventional post-type landing gear this is not possible since the degree of tilting is only very limited, being determined by the short travel of the foot pieces.

Other types of landing gear which have been designed and used in some cases are of the pivoted or swinging type, being pivotally secured in one form or another to the underframe of the trailer and arranged to be swung upwardly out of ground-contacting position to free the trailer for movement and to be then swung back down into ground-supporting position to free the trailer for disconnection from the tractor. These known swinging types of landing gear however involve rather complex structural and operating mechanisms and are frequently subject to mechanical failures as well as to damage because of the failure on the part of the operator to retract them before moving the vehicle.

The present invention is directed to an improved form of the hinged or swinging-type landing gear which is of comparatively simple construction, easily operated, and which avoids the difficulties commonly encountered with more conventional landing gear designs.

In accordance with a preferred embodiment of this invention the landing gear comprises a pair of leg or support members which are of generally scissorlike construction mounted on opposite sides of the underframe of a trailer near its forward end. Each of the support members is defined by a pair of legs pivotally connected to each other at a point intermediate the ends thereof, the legs being of generally triangular shape facing oppositely and the portions of the legs below the pivoted connection between the legs forming foot pieces adapted, with the pivoted connection therebetween, to provide a triangular support engageable with the ground. The upper portions of the two leg members are pivotally connected to the underframe of the trailer. The forward one of the two legs is secured to a fixed pivot carried by the underframe while the upper end of the rearward leg carries a roller to which it is pivoted and the roller is arranged for longitudinal movement inside a containing guide rail which allows the upper end of the rear leg to travel longitudinally toward and from the pivoted connection of the forward leg during extension and retraction of the support member. The several pivots and the arrangement provided enables the support member to be collapsed and swung upwardly beneath the tractor underframe when the support is to be removed and to be swung downwardly into ground-supporting position when support is required for the trailer.

With the arrangement provided by the present invention each of the support members will be secured at its upper end to the underframe in an arrangement in which the upper ends of the legs will be positioned on opposite sides of the central pivot between the legs and the two foot pieces of the respective legs will likewise be on opposite sides of the central pivot thereby providing a sturdy triangular support for the trailer such that the heavier the loading the more firm the support.

With the arrangement herein disclosed when the support members are retracted to their inactive position beneath the underframe, the forward end of the trailer may be lowered to contact with the ground or with a slightly elevated object on the ground to enable loading over the front end of the trailer of heavy equipment and the like.

Other and more specific objects and advantages of this invention will become more readily apparent from the following detailed description when read in conjunction with the accompanying drawing which illustrates a useful embodiment in accordance with this invention.

In the drawings:

FIG. 1 is a side elevation view of a conventional tractor-semitrailer combination showing the landing gear of the preferred embodiment in its retracted or folded position;

FIG. 2 is a side elevational view of the semitrailer showing the landing gear in its extended load-supporting position with the tractor removed from its connection to the semitrailer;

FIG. 3 is a side elevational view of one of the landing gear members shown in extended load-supporting position;

FIG. 4 is a view similar to FIG. 3 showing the support member in retracted position beneath the trailer underframe; and FIG. 5 is a view in elevation looking along line 5-5 of FIG. 3, the view showing one-half of the underframe of the trailer with the corresponding support member on one side thereof.

FIG. 1 shows a conventional combination of a semitrailer T and a tractor P connected by the usual fifth wheel W and king pin K. The landing gear comprises a pair of generally scissor-like support members, each designated generally by the letter S, one located on each side of the semitrailer underframe F near its forward end. Since the support members are identical the description of one will apply to the other.

Each of the support members comprises a forward leg 10 of generally triangular-shape including an upper leg section 11 and a foot piece 12 joined to define an apex portion 13 at an obtuse angle between the sections which faces forwardly of the support member. A gusset plate 14 extends between the leg sections to reinforce the leg. The other element of the support member comprises the rearward leg 15 defined by the upper leg section 16 and the foot piece 17 joined to form the apex section 18 also defining an obtuse angle which faces rearwardly of the support member. The two legs are pivotally connected together by a pivot pin 19 which extends through the apex portions 13 and 18. Foot piece 12 carries a laterally outwardly extending ground support bar 20 which is reinforced by an angle plate 21 connecting the bar with foot piece 12. A cylindrical crossbar 22 extends between foot pieces 17 of the rear legs of the support members on opposite sides of the trailer to form a rigid connection therebetween. The upper end of forward leg 10 is connected by means of a pivot pin 24 to a bracket 26 which is fixedly secured beneath the underframe F of the trailer. The center of pivot pin 24 will be located forwardly of the center of pivot 19 at all times. The upper end of upper section 15 of rear leg 16 is connected by means of a pivot pin 28 to a roller 30 which is mounted to roll in a confining rail 32 extending longitudinally of the underframe of the trailer rearwardly from bracket 26. Rail 32, as illustrated, may conveniently be formed from a length of channel iron. The forward end of rail 32 is closed by a vertically extending end plate or post 34 which forms a limit stop for movement of the upper end of the forward rearward leg positioned to limit its movement forwardly to a point which is at all times spaced rearwardly of pivot 19.

With this arrangement, the pivots 28 and 24 when the legs are in the extended position (FIG. 3) will be on opposite sides of a center defined by pivot 19 while foot pieces 12 and 17 will likewise extend angularly on opposite sides of the center defined by pivot 19 when in their ground-engaging positions. With the parts so positioned, load applied to frame F will tend to force foot pieces 12 and 17 apart and thereby actually increase the load-supporting advantages provided by the support members.

An angle plate 18a extends between upper and lower leg sections 16 and 17 of rear leg 15. A reinforcing angle plate 38 extends between crossbar 22 and each foot piece 17 of the rearward legs (FIG. 5). A cable 40 is secured to the center of crossbar 22 and is wound about a winch 42 mounted in a bracket 44 slung beneath underframe F (FIG. 5) by means of which rearward pull may be applied to the landing gear when it is desired to retract the same to the position shown in FIG. 4, the winch being operated by handle 46 a part of which is shown in FIG. 5 and which, it will be understood, may extend outside of the frame to be available for turning by the operator. When the landing gear is pulled upwardly to its retracted position as shown in FIG. 4 the rearward movement requires a slight elevation of the forward end of the trailer to enable foot bar 20 to clear the ground. This will always be accomplished when the tractor is moved beneath the trailer to engage fifth wheel W with the king pin K. The resulting engagement will generally produce the required few inches in elevation so that the foot piece bar 20 will clear ground surface G as best seen in FIG. 4 and illustrated by the broken circles thereon, as it is swung rearwardly and upwardly about the several pivoted connections between the legs and the trailer underframe.

In operation, when the support members are dropped to their ground-engaging position, the points of support being located on opposite sides of the pivot center, maximum load-supporting stability will be provided. Also, if for any reason, the operator should fail to retract the support members after the tractor is in place, the several pivots between the elements of the support members will allow the support members to be pushed freely rearwardly when an obstruction is encountered in the path of travel by the foot portions, greatly minimizing any damage to the support members.

It will be understood that various changes and modifications may be made in the illustrative embodiment without departing from the invention herein disclosed.

I claim:

1. Landing gear for semitrailers and the like having and underframe, comprising:
   a. a pair of parallel, laterally spaced apart, scissorlike support members pendently mounted beneath the forward portion of the underframe;
   b. each support member comprising a forward leg and a rearward leg;
   c. pivot means connecting said legs at a point intermediate their ends;
   d. the portions of said legs below said pivot means being bent respectively forwardly and rearwardly at obtuse angles to form angularly extending ground-engaging foot portions;
   e. a fixed pivoted connection between the upper end of the forward leg and the underframe;
   f. a longitudinally movable pivoted connection between the underframe and the upper end of the rearward leg arranged to permit longitudinal movement of the latter relative to said fixed pivoted connection in retraction and extension of the support member;
   g. a crossbar connecting the foot portions of said rearward legs; and
   h. means mounted to the underframe and connected to said crossbar for moving said support members between extended and retracted positions.

2. Landing gear according to claim 1, wherein said foot portions of the forward legs are provided with laterally outwardly extending, cylindrical ground-engaging bars.

3. Landing gear according to claim 1, wherein said movable pivoted connection comprises:
   a. a pivot pin carried by the upper end of said rearward leg;
   b. a roller rotatably mounted on said pivot pin;
   c. an elongated channel-shaped rail longitudinally disposed beneath said underframe to receive said roller; and
   d. stop means on said rail to limit forward movement of the roller along the rail.